United States Patent [19]
Chen

[11] Patent Number: 5,855,141
[45] Date of Patent: Jan. 5, 1999

[54] SCROLLING DEVICE

[76] Inventor: Tai-Shan Chen, No. 114, Lane 694, Chung Cheng Rd., Hsin Chuang City, Taipei Hsien, Taiwan

[21] Appl. No.: 919,879

[22] Filed: Aug. 28, 1997

[51] Int. Cl.[6] .............................. F16H 55/17; B23Q 1/68; F16D 11/04; H02N 1/04
[52] U.S. Cl. ........................... 74/435; 192/139; 160/310; 74/2
[58] Field of Search ................. 74/2, 3.52, 435, 74/3; 160/310, 311; 192/139

[56] References Cited

U.S. PATENT DOCUMENTS

| | | | |
|---|---|---|---|
| 4,411,348 | 10/1983 | Fillion | 192/139 |
| 4,417,185 | 11/1983 | Bullat | 160/310 |
| 5,040,843 | 8/1991 | Russell et al. | 160/310 |
| 5,638,884 | 6/1997 | Lin | 160/310 |
| 5,711,360 | 1/1998 | Viotte | 160/310 |
| 5,743,320 | 4/1998 | Mckeon | 160/310 |

*Primary Examiner*—Charles A. Marmor
*Assistant Examiner*—Marcus Charles
*Attorney, Agent, or Firm*—Wolf, Greenfield & Sacks, P.C.

[57] ABSTRACT

A scrolling device includes a first disk, a second disk and a middle disk wherein a shaft extends through the disks and two setting devices are respectively disposed between the middle disk and the respective one of the first and the second disk. A casing receives the three disks therein and is driven by a motor which is controlled by two control members disposed to the first and second disk. Each of the setting devices include a base gear and a plurality of wheels each of which has a toothed periphery and a cam member formed in a first side thereof, and two teeth extending laterally from a second side thereof, a setting member and a positioning member pivotally and respectively disposed between the middle disk and the respective one of the first and the second disk. The setting members each have gears engagable with the wheels and base gear, and a plurality of plates engagable with the cam members to set the wheels. The positioning members each have a plurality of studs which are able to be received in a respective cavity defined in each of the wheels whereby the wheel may be set, and a push member which is able to touch the control member to stop the motor. The shaft has a gear device meshed with a toothed inner periphery of the casing so that the rotating casing is stopped when the studs of the positioning members are received in the cavities of the wheels, while the push members actuate the control members.

8 Claims, 7 Drawing Sheets

FIG. 9

SCROLLING DEVICE

BACKGROUND OF THE INVENTION

1. Field of the Invention

The present invention relates to a scrolling device and, more particularly, to a scrolling device which is used on a scrolling door and able to set positions of the scrolling door.

2. Brief Description of the Prior Art

Conventional scrolling devices used for scrolling doors or scrolling curtains generally involve a complicated structure and a high price. Besides, if a setting of the scrolling door or curtain is to be changed, some very complicated processes and a lot of trial and error is taken.

The present invention intends to provide an improved scrolling device to mitigate and/or obviate the above-mentioned problems.

SUMMARY OF THE INVENTION

The present invention provides a scrolling device which comprises a first disk, a second disk and a middle disk located between the first and the second disk, wherein each of the first and the second disk has a cut out defined in a periphery thereof, a shaft extending through the three disks, the shaft having a gear means connected to a distal end thereof which extends from the first disk. Each of the first and the second disk has a control member disposed to a side thereof and located corresponding to the cut out.

Two setting assemblies are respectively disposed between the middle disk and the respective one of the first disk and the second disk. Each of the setting assemblies comprises a base gear securely mounted to the shaft and at least a first and a second wheel respectively and freely mounted to the shaft. Each one of the first and second wheels has a first side with a toothed periphery and a cam member protruding therefrom, and a second side of the wheel with two teeth extending laterally from a periphery thereof. Each of the first and the second wheels has a cavity defined in a peripheral surface thereof.

A setting member and a positioning member are pivotally connected between the middle disk and the respective one of the first and the second disks. Two frames extend downwardly from the setting member so that a rod is connected therebetween and at least a first gear and a second gear are mounted to the rod. The first gear is threadedly engaged with the base gear and the toothed periphery of the first wheel beside the base gear. The second gear meshes with the toothed periphery of the second wheel. The two teeth are able to mesh with the second gear within each revolution of the first wheel. At least two plates extend laterally from the setting member and each of the plates has an engaging portion formed thereto so as to engage with the cam member of the first and the second wheel. A block extends from one end of the setting member and a polygonal recess is defined in the end of the setting member.

A bar has a first end with a polygonal head and a second end with a side plate extending laterally therefrom, the polygonal head being received in the polygonal recess of the setting member.

The positioning member has at least two studs and a pull plate respectively extending downwardly therefrom and a push member extends longitudinally from one of two ends of the positioning member wherein the push member extends through the cut out corresponding thereto.

A casing rotatably receives the first disk, the second disk and the middle disk therein and has a toothed inner periphery which meshes with the gear means.

It is an object of the present invention to provide a motor driven scrolling device whose beginning status and end status are easily set.

Other objects, advantages, and novel features of the invention will become more apparent from the following detailed description when taken in conjunction with the accompanying drawings.

DETAILED DESCRIPTION OF THE PREFERRED EMBODIMENT

Referring to the drawings and initially to FIGS. 1 through 4, a scrolling device in accordance with the present invention generally includes a first disk 11, a second disk 13 and a middle disk 12 located between the first and the second disk 11, 13 wherein each of the first and the second disk 11, 13 has a cut out 110/130 defined in a periphery thereof. A shaft 14 extends through the first disk 11, the middle disk 12 and the second disk 13, the shaft 14 having a gear means connected to a distal end thereof which extends from the first disk 11 and the gear means includes a first transmitting gear 30 connected longitudinally to the shaft 14 and a second transmitting gear 15 is rotatable disposed to the first disk 11 and meshes with the first transmitting gear 30. Each of the first and the second disk 11, 13 has a control member 16/17 disposed to a side thereof and located corresponding to the cut out 110/130. Each of the control members 16, 17 has a button member 162, 172 extending from a top thereof.

Two setting assemblies are respectively disposed between the middle disk 12 and the respective one of the first and the second disk 11, 13. Each of the setting assemblies comprises a base gear 32 securely mounted to the shaft 14 and a first, a second and a third wheel 20, 20', 20" respectively and freely mounted to the shaft 14. Each one of the first, the second and the third wheel 20, 20', 20" has a first side with a toothed periphery 202, 202', 202" and a cam member 206 protruding therefrom. A second side of the first and the second wheels 20, 20' each has a pair of teeth 204, 204' extending laterally from a periphery thereof. Each of the first, the second and the third wheels 20, 20', 20" has a cavity 208 defined in a peripheral surface thereof.

Figure 1:
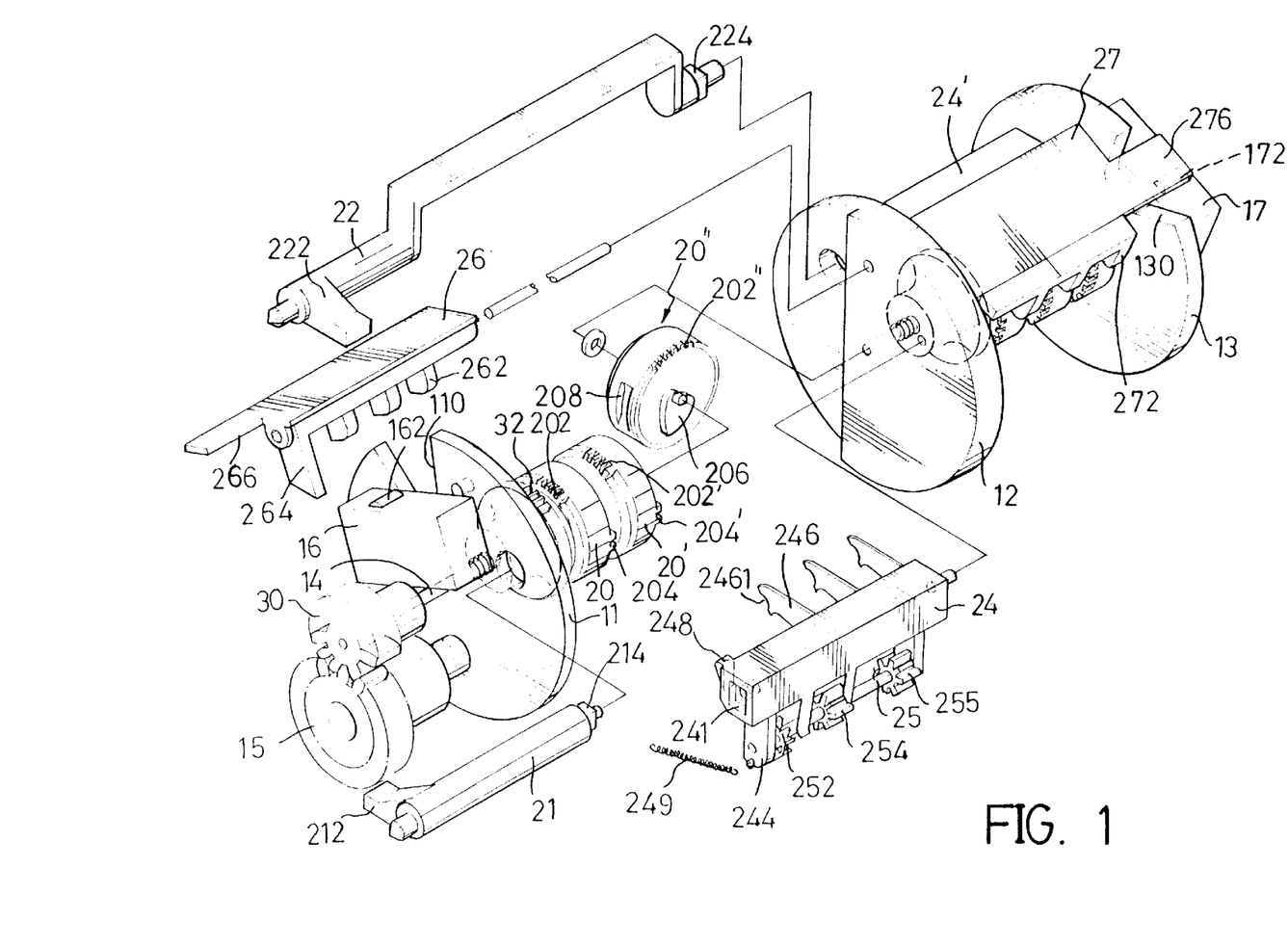
FIG. 1 is an exploded view of a scrolling device in accordance with the present invention.
Figure 2:
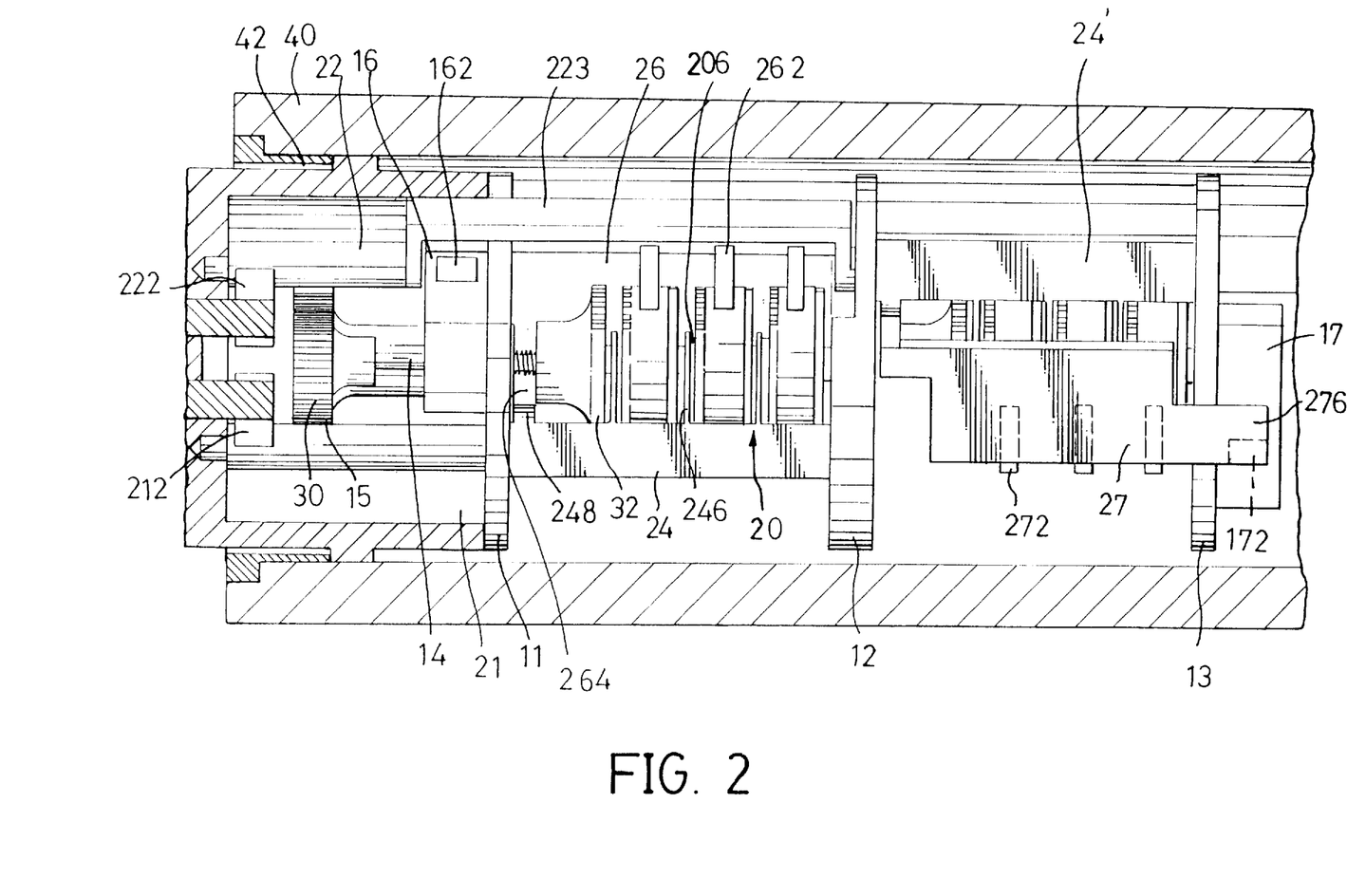
FIG. 2 is a side elevational view, partly in section, of the scrolling device of the present invention.
Figure 3:
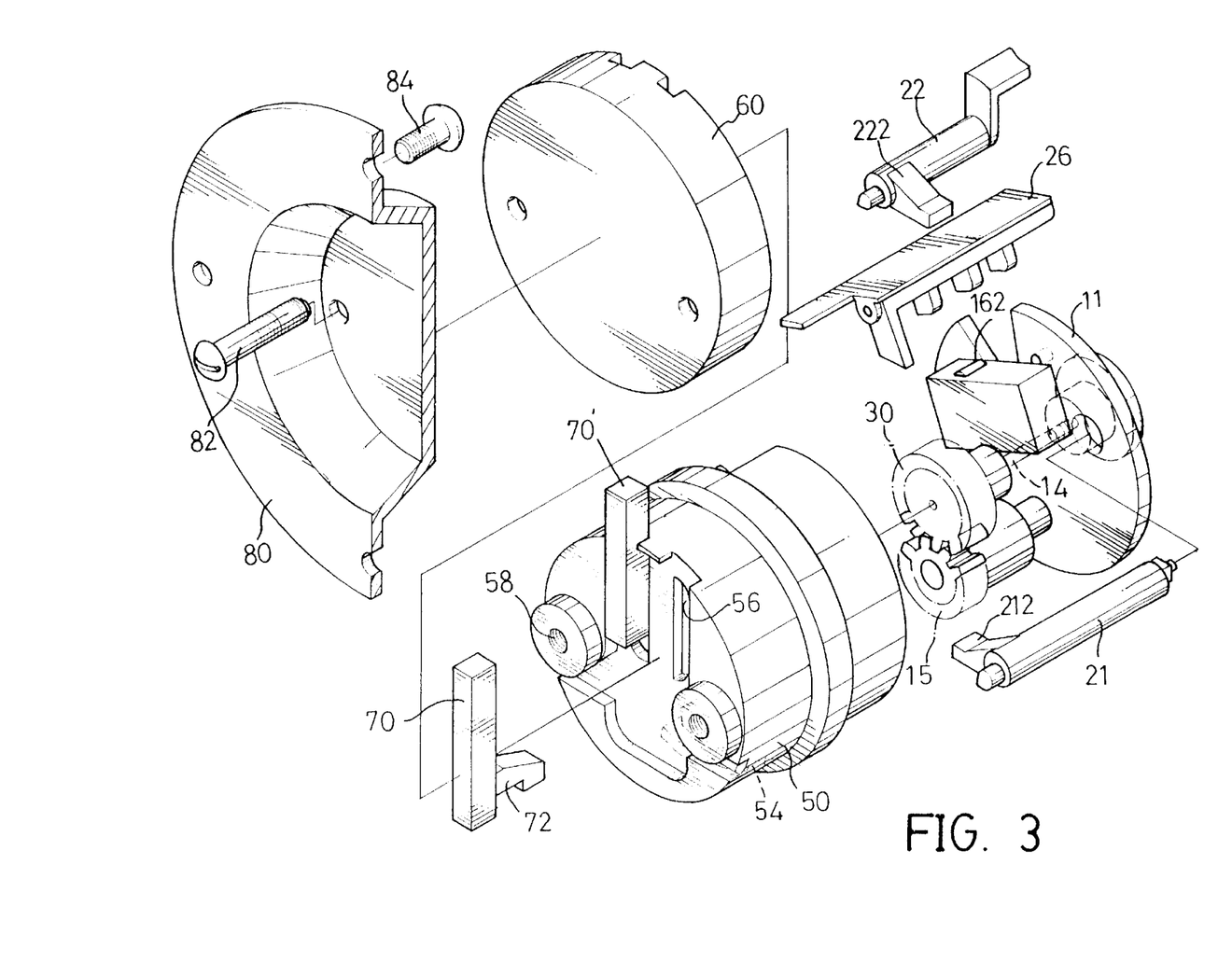
FIG. 3 is an exploded view of a fixing assembly for fixedly disposing the device on a vertical surface.
Figure 4:
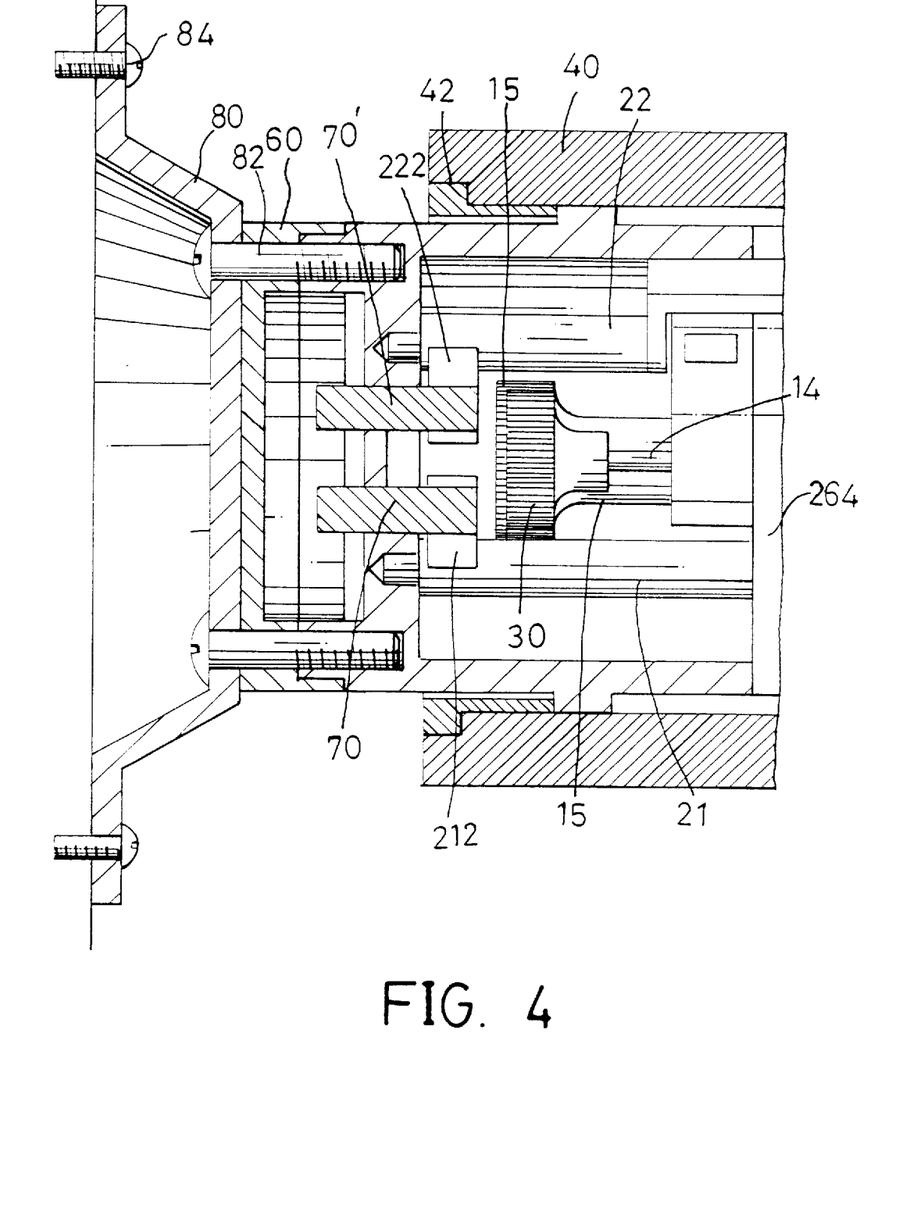
FIG. 4 is a side elevational view, partly in section, of the fixing assembly which disposes the device on the vertical surface.

Two setting members 24, 24' are pivotally connected between the first disk 11 and the middle disk 12, and the middle disk 12 and the second disk 13. Each of the setting members 24, 24' has two frames 244 extending downwardly therefrom so that a rod 25 is connected therebetween and a first, a second and a third gear 252, 254, 255 are mounted to the rod 25. The first gear 252 meshes engaged with the base gear 32 and the toothed periphery 202 of the first wheel 20 beside the base gear 32. The second gear 254 meshes with the toothed periphery 202' of the second wheel 20' and the third gear 255 meshes with the toothed periphery 202" of the third wheel 20".

Each of the setting members 24, 24' has three plates 246 extending laterally therefrom and each of the plates 246 has a curved engaging portion 2461 formed thereto so as to engage with the cam member 206 of the respective wheels 20, 20', 20". Each of the setting members 24, 24' has a block 248 extending from one end thereof and a polygonal recess 241 defined in the end thereof.

A first bar 21 has a first end with a polygonal head 214 and a second end with a side plate 212 extending laterally therefrom. The first bar 21 extends through the first disk 11 and the polygonal head 214 is received in the polygonal recess 241 of the setting member 24 between the first disk 11 and the middle disk 12. Similarly, a second bar 22 extends through the first disk 11 and is engaged with the other setting member 24 disposed between the middle disk 12 and the second disk 13, the second bar 22 also has a polygonal head 224 formed on a first end thereof and a side plate 222 extending laterally from a second end thereof.

Two positioning members 26, 27 are respectively and pivotally connected between the first disk 11 and the middle disk 12, and the middle disk 12 and the second disk 13. Each of the positioning members 26, 27 has three studs 262, 272 (see FIG. 8) and a pull plate 264, 274 (see FIG. 8) respectively extending downwardly therefrom, and a push member 266, 276 (see FIG. 8) extending longitudinally from one of two ends thereof. The push members 266, 276 respectively extend through the cut out 110/130 corresponding thereto. Two springs 249 are respectively connected between the setting member 24 and the first disk 11, and the setting member 24' and the second disk 13 (see FIG. 8).

A casing 40 rotatably receives the first disk 11, the second disk 13 and the middle disk 12 therein and has a toothed inner periphery 42 which meshes with the second transmitting gear 15 of the gear means. A curtain, a foldable shield or the like can be wrapped around the casing 40 and can be extended when the casing 40 is rotated.

Figure 5:
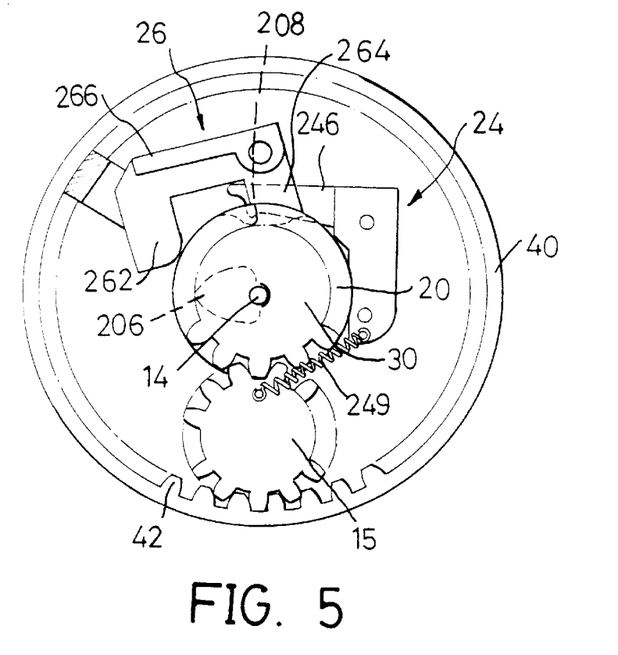
FIG. 5 is an end plan view seen from a first disk to illustrate an arrangement of the setting assembly between two disks.

A fixing assembly is used to fixedly connect the scrolling device on a vertical surface (see FIG. 4) and includes a bowl member 80 fixedly connected to the vertical surface by bolts 84 (only one is shown) and a cover 60 disposed to the bowl member 80 by bolts 82 (only one is shown). An end cap 50 is mounted to the first disk 11 and has an opening 54 defined in a periphery thereof so that the second transmitting gear 15 extends therefrom to mesh with the toothed inner periphery 42, and two slots 56 defined therein. Two L-shaped members 70, 70' each have an actuating portion 72 extending therefrom which is movably inserted through the corresponding slot 56 to contact the side plates 212, 222 respectively. The end cap 50 has two screw holes 58 defined therein so that the bolts 82 extend through the cover 60 and are threadedly engaged with the screw holes 58 of the end cap 50. Referring to FIG. 5, when the two L-shaped members 70, 70' are not pushed, the positional relationship of the parts of the setting means is shown. That is to say, when the casing 40 is driven to rotate by a motor (not shown), a power is transmitted to the second transmitting gear 15 of the gear means via the threaded inner periphery 42 of the casing 40 and the base gear 32 is rotated because the first transmitting gear 30 is rotated by the second transmitting gear 15. The first wheel 20 is rotated by the first gear 252 which is engaged with the base gear 32. The two teeth 204 on the first wheel 20 mesh with the second gear 254 within a revolution of the first wheel 20, in the meanwhile, the second gear 254 meshes with the toothed periphery 202' of the second wheel 20' so that the second wheel 20' is rotated an angle while the first wheel 20 rotates a full revolution. Similarly, the two teeth 204' on the second wheel 20' rotate the third gear 255 an angle within a revolution of the second wheel 20', and the third gear 255 rotates the third wheel 20" an angle. The studs 262, 272 are not received in the cavities 208 of the corresponding wheels 20, 20', 20" unless the setting members 24 are rotated to let the engaging portions 2461 of the plates 246 be engaged with the cam members 206 of the wheels 20, 20', 20". At this moment, all the cavities 208 are moved to positions where the studs 262 are able to be inserted therein.

Figure 7:
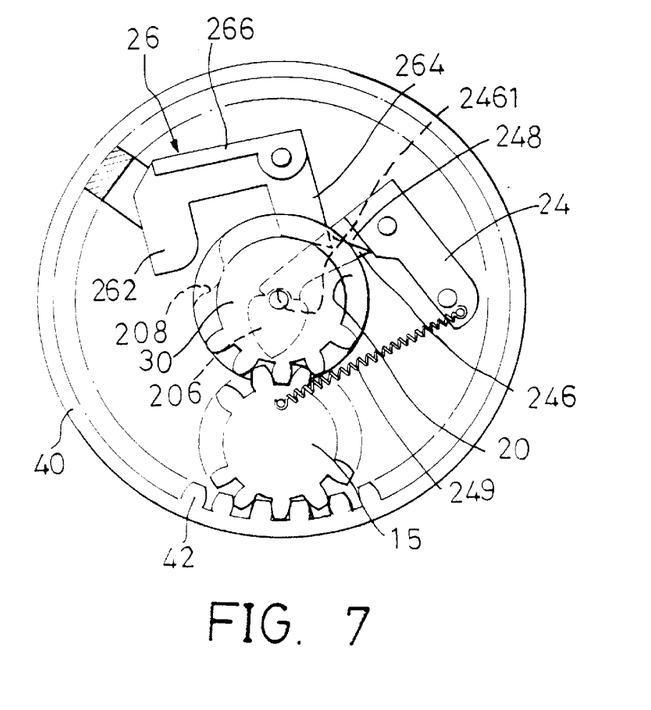
FIG. 7 is an end plan view, seen from the first disk, to illustrate the bar and the setting member of the present invention are rotated to let the plates be engaged with cam members of wheels in the setting assembly.

Referring to FIG. 7, a beginning status of the scrolling device can be set by pushing the L-shaped member 70 to press the side plate 212 of the first bar 21 downwardly so that the setting member 24 connected to the first bar 21 is pivoted and the three plates 246 are engaged with the three cam members 206 wherein the three cavities 208 are located at pre-determined positions which are in alignment with the three studs 262. The side plate 264 of the positioning member 26 is therefore pushed by the block 248 when the setting member 24 is pivoted so that the studs 262 are raised away from the wheels 20, 20', 20". When the L-shaped member 70 is released, the setting member 24 is pivoted to its original position by the spring 249 so that the plates 246 are set away from the cam members 206 and the positioning member 26 is pivoted by its own weight so that the studs 262 are received in the cavities 208 of the wheels 20, 20', 20". When the studs 262 are received in the cavities 208, the push member 266 is lowered to touch the button member 162 so as to stop the motor (not shown), the beginning status is set. Once the push member 266 is moved away from the button member 162, the motor is actuated to rotate the casing 40.

Figure 6:
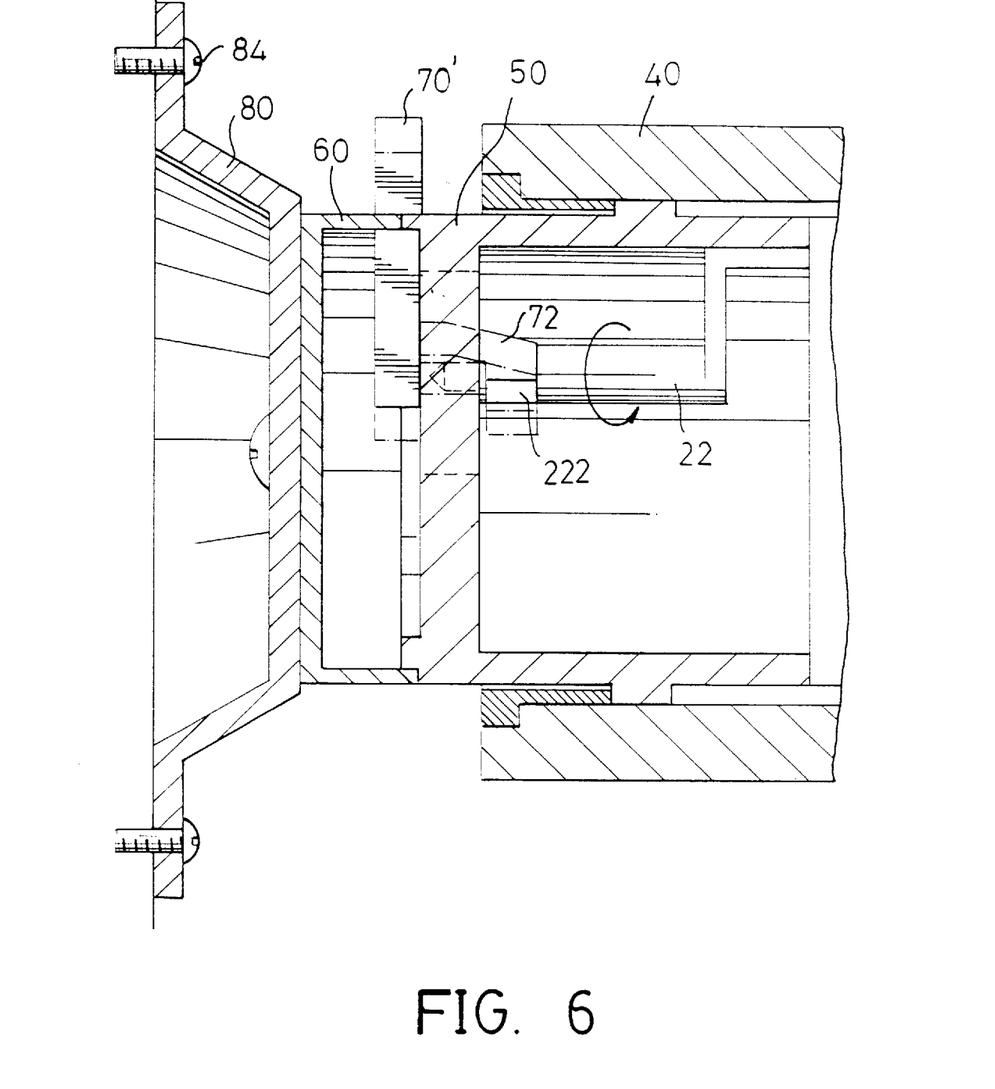
FIG. 6 is a side elevational view, partly in section, of the scrolling device, wherein an L-shaped member is pushed to rotate a bar of the setting assembly of the scrolling device.
Figure 8:
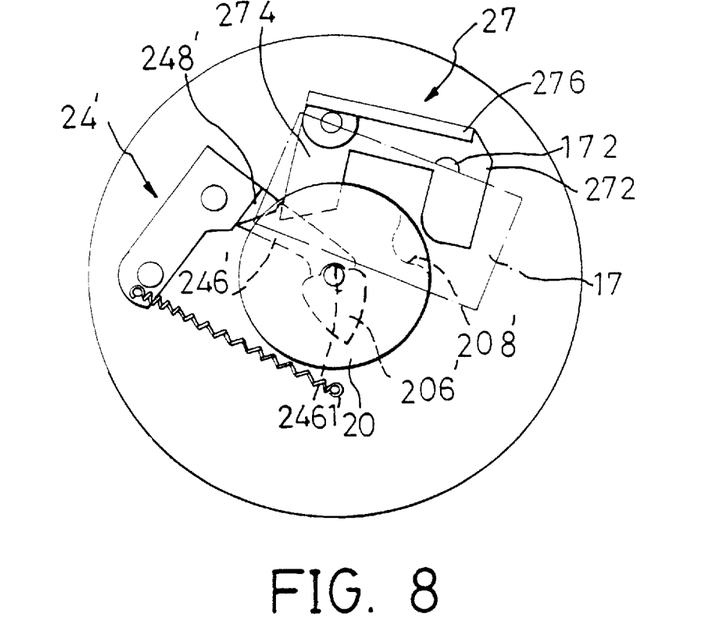
FIG. 8 is an end plan view, seen from a third disk, to illustrate when the setting member is rotated to let plates be engaged with cam members of the wheels and the positioning member is pivoted by the setting member so that a control member is not actuated.
Figure 9:
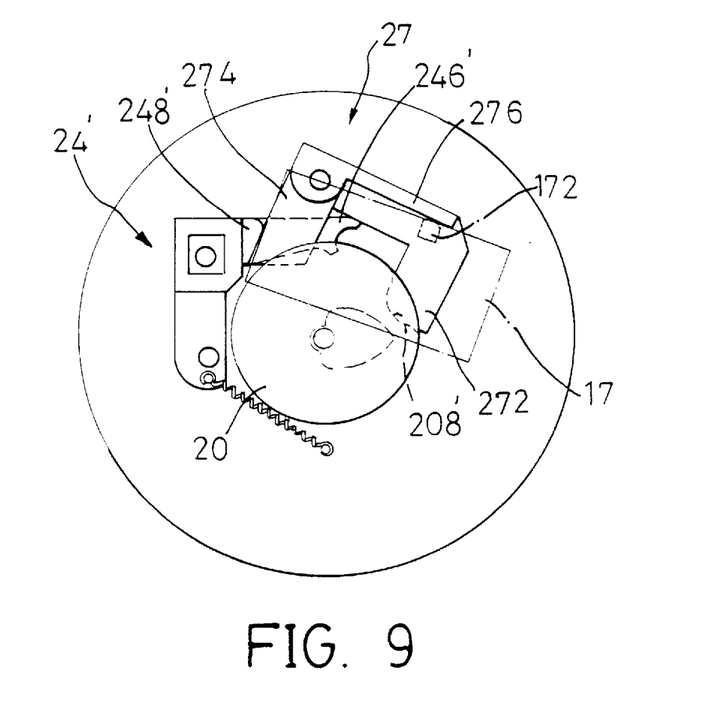
FIG. 9 is an end plan view, seen from a third disk, to illustrate when the setting member is reversely rotated to let plates be disengaged with cam members of the wheels and the positioning member is pivoted by gravity to actuate the control member.

An end status is set when the casing 40 is rotated for a certain number of revolutions and the curtain, the foldable shield or the like wrapped around the casing 40 is extended to a desired length. At this moment when the desired length is reached, the L-shaped member 70' is pushed as shown in FIGS. 6 and 8, the second bar 22 together with the other setting member 24' are rotated and the engaging portions 2461' of the plates 246' of the setting member 24' are engaged with the cam members 206' of the wheels 20 (only one is shown) disposed between the middle disk 12 and the second disk 13. The cavities 208' are located to the positions in alignment with the studs 272 and the pull plate 274 of the positioning member 27 is pushed by the block 248' of the setting member 24' to let the studs 272 be raised. At this moment as shown in FIG. 8, the casing 40 is still rotating because the button member 172 of the control member 17 is not yet touched by the push member 276. Referring to FIG. 9, when the curtain, the foldable shield or the like reaches the desired length, the L-shaped member 70' is released to let the push member 276 lower to touch the button member 172 to stop the motor so that the curtain, the foldable shield or the like will be stopped at the position where the button member 172 is touched. Therefore, whenever the casing 40 rotates to either a beginning position or an end position, the studs 262 or 272 will drop to be received in the cavities 208 or 208' to stop the motor.

An operator can re-adjust the length of the curtain, the-foldable shield or the like as he/she wants, that is to say, a new position can be set by pushing the L-shaped member 70/70' and then release it when a new desired position is reached.

Although the invention has been explained in relation to its preferred embodiment, it is to be understood that many other possible modifications and variations can be made without departing from the spirit and scope of the invention as hereinafter claimed.

What is claimed is:

1. A scrolling device comprising:

a first disk, a second disk and a middle disk located between said first and said second disk wherein each of said first and said second disk has a cut out defined in a periphery thereof, a shaft extending through said first disk, said middle disk and said second disk, said shaft having a gear means connected to a distal end thereof which extends from said first disk, each of said first and said second disk, having a control member disposed to an side thereof and located corresponding to said cut out;

two sets of setting assemblies respectively disposed between said middle disk and said respective one of said first and said second disk, each of said setting assemblies comprising:

a base gear securely mounted to said shaft and at least a first and a second wheel respectively and freely mounted to said shaft, each one of said wheels having a first side with a toothed periphery and a cam member protruding therefrom, and a second side of said wheel with two teeth extending laterally from a periphery thereof, each of said first and said second wheel having a cavity defined in a peripheral surface thereof;

a setting member pivotally connected between said middle disk and said respective one of said first and said second disk, two frames extending downwardly from said setting member so that a rod is connected therebetween and at least a first and a second gear are mounted to said rod, said first gear meshed with said base gear and said toothed periphery of said first wheel beside said base gear, said second gear meshed with said toothed periphery of said second wheel wherein said two teeth are able to mesh with said second gear within each revolution of said first wheel, at least two plates extending laterally from said setting member and each of said plates having an engaging portion formed thereto so as to engage with said cam member of said first and said second wheel, a block extending from one end of said setting member and a polygonal recess defined in said end of said setting member;

a bar having a first end with a polygonal head and a second end with a side plate extending laterally therefrom, said polygonal head received in said polygonal recess of said setting member;

a positioning member pivotally connected between said middle disk and said respective one of said first and said second disk, at least two studs and a pull plate respectively extending downwardly from said positioning member and a push member extending longitudinally from one of two ends of said positioning member wherein said push member extends through said cut out corresponding thereto; and a casing rotatably receiving said first disk, said second disk and said middle disk therein and having a toothed inner periphery which is meshed with said gear means.

2. The scrolling device as claimed in claim 1 wherein a spring is connected between said setting member and said first/second disk.

3. The scrolling device as claimed in claim 1 wherein said studs are able to be received in said cavities of said first and said second wheel.

4. The scrolling device as claimed in claim 1 wherein said pull plate is pushed by said block when said bar is rotated.

5. The scrolling device as claimed in claim 1 wherein said control member is able to be actuated by said push member.

6. The scrolling device as claimed in claim 1 wherein said gear means includes a first transmitting gear connected to said shaft and a second transmitting gear rotatably disposed to said first disk and meshed with said first transmitting gear, wherein said second transmitting gear is meshed with said toothed inner periphery of said casing.

7. The scrolling device as claimed in claim 1 wherein an end cap is mounted to said first disk and has an opening defined in a periphery thereof so that said gear means extends therefrom.

8. The scrolling device as claimed in claim 1 wherein at least one L-shaped member has an actuating portion extending therefrom which is inserted through said slot to contact said side plate of said bar.

* * * * *